United States Patent [19]

Vorel

[11] Patent Number: 4,985,820

[45] Date of Patent: Jan. 15, 1991

[54] DRIVER CIRCUIT FOR SWITCHING ON LAMP WITH LOW COLD RESISTANCE

[75] Inventor: Anton Vorel, Eggenfelden, Fed. Rep. of Germany

[73] Assignee: Texas Instruments Deutschland GmbH, Fed. Rep. of Germany

[21] Appl. No.: 347,973

[22] Filed: May 5, 1989

[30] Foreign Application Priority Data

May 6, 1988 [DE] Fed. Rep. of Germany ....... 3815604

[51] Int. Cl.$^5$ ........................ H02M 7/42; H02H 7/122

[52] U.S. Cl. ........................................ 363/49; 323/315; 315/291; 315/310; 363/20; 363/55

[58] Field of Search ............... 323/238, 243, 246, 265, 323/274, 275, 278, 282, 284, 285, 315, 321, 325, 349, 351, 352, 901, 908; 363/49, 50, 55, 74, 79, 80, 20, 21; 315/291, 308, 309, 310, 311, 77, 78, 82; 361/18, 90, 91, 111

[56] References Cited

U.S. PATENT DOCUMENTS

| | | | |
|---|---|---|---|
| 3,204,175 | 8/1965 | Kuriger | 323/901 X |
| 4,423,478 | 12/1983 | Bullock et al. | 323/238 X |
| 4,503,365 | 3/1985 | Kirk | 315/310 |
| 4,563,733 | 1/1986 | Schlenk | 323/901 X |
| 4,617,496 | 10/1986 | Samodovitz | 315/291 X |
| 4,644,229 | 2/1987 | Masaki | 323/321 X |
| 4,818,953 | 4/1989 | Feldstein | 363/133 X |
| 4,819,117 | 4/1989 | Brennan et al. | 323/908 X |

FOREIGN PATENT DOCUMENTS 0051854 5/1982 European Pat. Off. .

*Primary Examiner*—Steven L. Stephan
*Assistant Examiner*—Emanuel Todd Voeltz
*Attorney, Agent, or Firm*—William E. Hiller; N. Rhys Merrett; Melvin Sharp

[57] ABSTRACT

A driver circuit for switching on lamps with low cold resistance. The circuit includes a power transistor (T5) of which the collector-emitter path is connected to the lamp (12) in a series circuit which lies between a positive terminal and a ground terminal of a supply voltage source. The circuit further includes an RC member comprising a resistor (R1) which is connected on one side to the ground terminal and a capacitor (C) which is connected in series with the resistor and on one side to the positive terminal of the supply voltage source. A comparator (38) compares the voltage at the resistor (R1) with the voltage at the collector of the power transistor (T5) and furnishes at an output a blocking signal for the power transistor (T5) when the voltage at the resistor (R1) is more negative than the voltage at the collector. A limiting member (T4) limits the voltage at the resistor (R1) to a voltage value lying above the saturation voltage of the power transistor (T5).

5 Claims, 1 Drawing Sheet

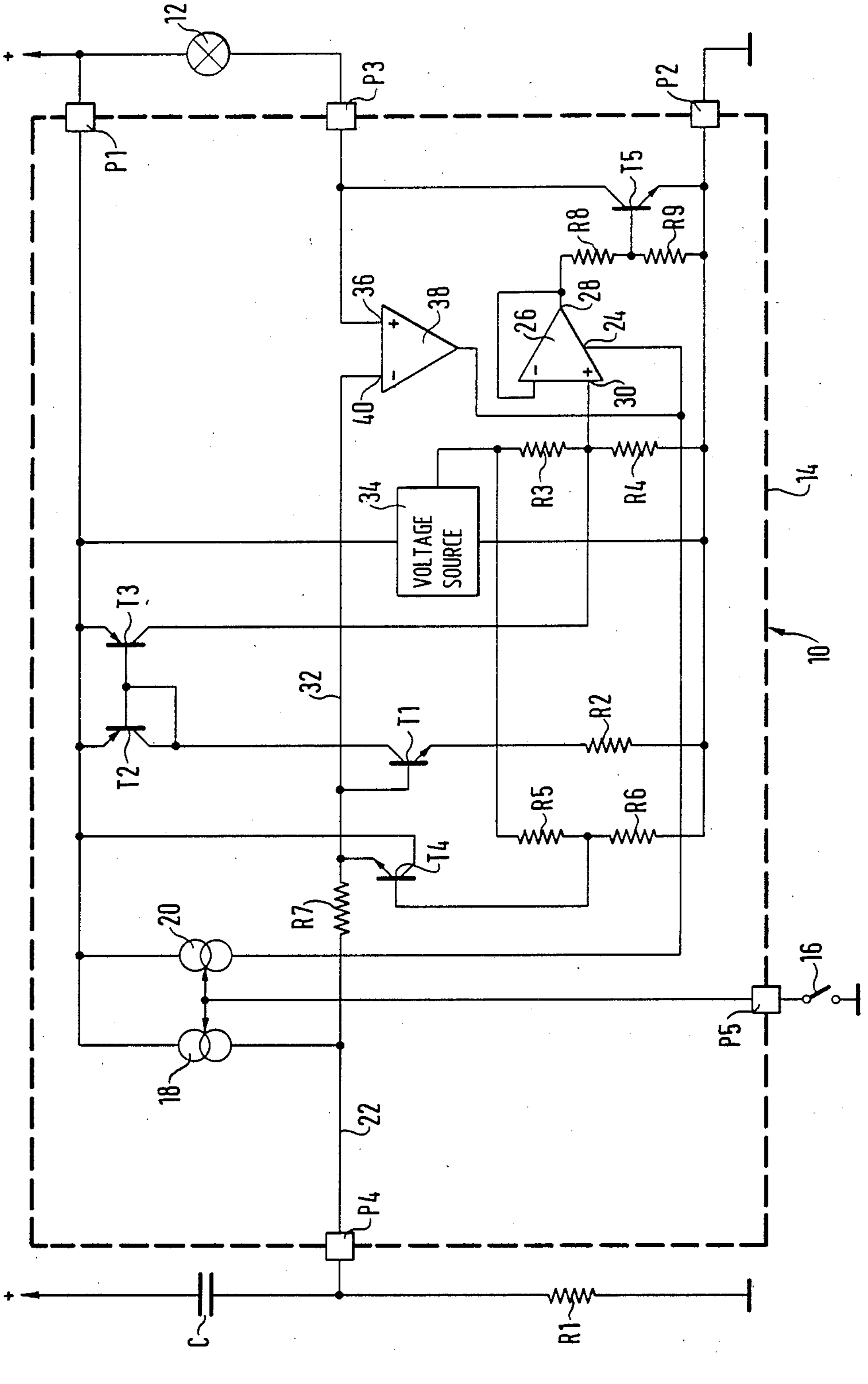
12
P1
P2
P3
P4
P5
T1
T2
T3
T4
T5
R1
R2
R3
R4
R5
R6
R7
R8
R9
C
VOLTAGE SOURCE
10
14
16
18
20
22
24
26
28
30
32
34
36
38
40

DRIVER CIRCUIT FOR SWITCHING ON LAMP WITH LOW COLD RESISTANCE

BACKGROUND OF THE INVENTION

The invention relates to a driver circuit of lamps with low cold resistance comprising a power transistor of which the collector-emitter path is connected to the lamp in a series circuit which lies between a positive terminal and a ground terminal of a supply voltage source.

Lamps in which the emitted light is generated by passing a current through a resistance filament which heats the filament to white heat have in the unconnected state a low cold resistance which is for example only 10% of the resistance in the incandescent state. At the moment of switching on such a lamp simulates a short-circuit so that at the switching-on instant a relatively high current begins to flow. The same case however occurs when a short-circuit is present parallel to the lamp, this latter case however frequently leading to destruction of the source delivering the battery current or at least of components of said source.

In a known driver circuit of the type mentioned at the beginning steps are taken with the aid of which the high switching-on current can be supplied but nevertheless in the event of a short-circuit a protective mechanism still comes into operation. An essential part of this known driver circuit is an integrated circuit of type UAF 1780 made by the company Thomson Semiconductor. This module includes a very complicated circuit arrangement which moreover requires an extensive external wiring. The module or chip contains a DC voltage converter which requires as external components a coil and an electrolytic capacitor. The maximum output current which is supplied to the lamp to be switched on can be set with an external resistor. With a capacitor likewise to be externally connected a delay time is set. If in the event of a short-circuit the current set is exceeded then after expiry of the delay time the output is switched to the currentless condition. This means that in the known driver circuit detection of the case of a short-circuit takes place solely in dependence upon the time so that in the event of a short-circuit before expiry of the fixedly set delay time the high short-circuit current always flows through the driver transistor. Under unfavorable circumstances this can lead to destruction of the driver transistor.

The invention is based on the problem of providing a driver circuit of the type mentioned at the beginning which with low circuit expenditure makes a detection of a short-circuit not dependent on time possible. The driver circuit to be provided is to be adapted to production as fully integrated circuit apart from having a small number of external components.

In the driver circuit mentioned at the beginning this problem is solved by an RC member comprising a resistor connected on one side to the ground terminal and a capacitor lying in series therewith and connected on one side to the positive terminal of the supply voltage source, a comparator which compares the voltage at the resistor of the RC member with the voltage at the collector of the power transistor and furnishes at an output a blocking signal for the power transistor when the voltage at the resistor is more negative than the voltage at the collector, and a limiting member for limiting the voltage at the resistor of the RC member to a voltage value lying above the saturation value of the power transistor.

The function of the driver circuit according to the invention is based solely on a voltage comparison and this means that the short-circuit detection no longer depends on fixedly set time intervals but solely on the detection of the exceeding of predetermined voltage differences. The lower resistance the short-circuit has and the higher the operating voltage the sooner the short-circuit is detected and the blocking signal disconnecting the power transistor supplied. Since the comparator compares voltages which are derived in effect from the operating voltage present momentary voltage peaks of the operating voltage do not effect a disconnection of the power transistor as long as the voltages are not large enough to lead to destruction of the power transistor.

BRIEF DESCRIPTION OF THE DRAWINGS

An embodiment of the invention will be explained with the aid of the drawing which shows partly as a block circuit diagram a circuit of the driver circuit according to the invention.

DESCRIPTION OF THE PREFERRED EMBODIMENT

The driver circuit 10 to be described is intended to supply current to a lamp 12 mounted for example on the dashboard of a motor vehicle and having in the unconnected state a low ohmic cold resistance. All the parts of the driver circuit within the dashed line 14 can be accommodated in an integrated circuit; the only external circuit elements required are a resistor R1 and a capacitor C.

The driver circuit 10 comprises 5 terminals P1, P2, P3, P4 and P5. Connected to the terminals P1 and P2 is the supply voltage source, the terminal P1 being connected to the positive terminal thereof and the terminal P2 to the ground terminal thereof. In the application example outlined the power supply source is the battery of a motor vehicle. The lamp 12 lies between the terminal P1 and the terminal P3. The terminal P4 is connected to the connection point between the capacitor C and the resistor R1, the capacitor C and the resistor R1 lying in series between the positive terminal of the voltage supply source and ground. Connection and disconnection of the lamp 12 can be controlled by means of a switch 16 connected to the terminal P5. In the following example the lamp 12 is switched off when a signal with the ground value is applied to the terminal P5.

The driver circuit 10 is made up as follows:

Two schematically illustrated current sources 18 and 20 are provided which can be switched on with the aid of the signal supplied to the terminal P5. As long as no signal with ground value is applied to the terminal 5 the current sources 18 and 19 are ineffective but can be activated with the aid of the ground signal applied to the terminal P5. The lamp 12 is switched on by disconnecting the current sources 18 and 20. The current source 18 lies between the terminal P1 and a line 22 whilst the current source 20 lies between the terminal P1 and a control input 24 of an operational amplifier 26. The operational amplifier 26 furnishes at its output 28 a voltage having a magnitude depending on the voltage applied to its input 30. Said voltage is furnished however only when the current source 20 is ineffective, i.e. a corresponding activation signal is supplied to the control input 24. The base current of the transistor T5 is governed by the resistor R8 to which the output voltage 28 of the operational amplifier 26 is applied.

The voltage supplied to the input 30 of the operational amplifier 26 is generated inter alia by a current mirror which includes the resistor R2 and the transistors T1, T2 and T3. In accordance with its known function this current mirror generates in the collector line of the transistor T3 the same current which also flows in the collector line of the transistor T2 which in turn depends on the transistor T1 and the resistor R2. Since the base of the transistor T1 is connected to a line 32 the current flowing therethrough can be governed by the voltage at said line 32. The voltage at the line 32 thereby also determines the current impressed by the current mirror into the voltage divider R3, R4 and thus the voltage at the resistor R4, i.e. also the voltage at the input 30 of the operational amplifier 26. In addition, the voltage supplied to said input 30 is determined by the output voltage of a stabilized voltage source 34, the output voltage of which is supplied to a voltage divider consisting of the resistors R3 and R4. The connection point of the two resistors is connected to the input 30 of the operational amplifier 26.

The output of the voltage source 34 is connected to a further voltage divider comprising resistors R5 and R6 of which the connection point is connected to the base of a transistor T4 having an emitter connected to the line 32 and a collector connected to the terminal Pl. The line 32 is connected via a resistor R7 to the line 22.

Connected to the output 28 of the operational amplifier 26 is a voltage divider comprising resistors R8 and R9. The connection point of these two resistors is connected to the base of a transistor T5 which has its emitter connected to the terminal P2 and its collector to the terminal P3. The terminal P3 is further connected to an input 36 of a comparator 38 which has a second input 40 connected to the line 32. The output of said comparator 38 is connected to the control input 24 of the operational amplifier 26.

In the following outline of the mode of operation of the driver circuit it will be assumed that the lamp 12 is to be switched on and that no short-circuit is present parallel to the lamp. As already mentioned the lamp 12 is switched on by disconnecting the terminal P5 from ground.

In the rest state a positive voltage of +12 V is applied to the terminal P1, i.e. the usual voltage of a motor vehicle battery. The capacitor C is discharged, due to the effect of the current source 18. The operational amplifier 26 does not supply any output voltage because it receives at its control input current from the current source 20 and consequently the transistor T5 remains blocked. If now the lamp 12 is to be made to come on the switch 16 is opened so that the terminal P5 is connected to a higher resistance. The driver circuit is intended to permit a microprocessor to drive a lamp (e.g. the failure warning light of an antilocking system, an oil level warning light, or the like).

The disconnection of the terminal P5 from ground results in the discharge effect of the current source 18 ceasing so that the capacitor C is charged with a time constant dependent on its capacitance and the value of the resistor R1. The charging of the capacitor C causes the voltage at the terminal P4 to start to drop towards the ground value.

The transistor T4, the base voltage of which is fixed with the aid of the voltage divider R5, R6 fed by the stabilized voltage source 34, limits the voltage value to which the voltage at the line 32 can drop to about 1 V, said voltage value being about 0.5 V more positive than the saturation voltage of the transistor T5 occurring at the terminal P3.

The current source 20 does not now supply any current to the control input 24 of the operational amplifier 26 so that the latter is brought into the operative condition. At the input 30 the operational amplifier 26 receives in addition to the voltage derived from the voltage source 34 of the voltage divider R3, R4 an additional voltage through the current which is impressed by the current mirror T1, T2, T3 into the voltage divider R3, R4 in dependence upon the voltage at the line 32 and thus on the voltage at the resistor R1. The operational amplifier 26 thus receives in this stage an increased voltage which accordingly leads to an increased output voltage at the output 28 which in turn leads to the supply of an increased base current to the transistor T5. This effects the forward switching of the transistor T5 and the flow of a relatively high collector current through the lamp 12 which is thereupon brought into the switched-on state. After expiry of the time constant of R1, C the base current for T5 is derived only from the voltage which is impressed by the voltage source 34 on the voltage divider R3, R4. After expiry of the time constant R1, C the incandescent filament of the lamp 12 is heated up and thus has its high hot resistance. The reduced operating current is now adequate.

When operating the various driver circuits in a motor vehicle relatively high voltage peaks of the supply voltage frequently occur. However, as will be explained below these voltage peaks do not have any disadvantageous effects. If a voltage peak occurs in the supply voltage the voltage at the connection point of the capacitor C rises correspondingly. The current mirror controlled by said voltage and comprising the transistors T1, T2 and T3 supplies, due to this voltage rise, more current to the voltage divider defined by the resistors R3 and R4 and thus increases the input voltage of the operational amplifier 26. As a result the base current of the transistor T5 increases so that the latter is not immediately forced out of the saturation state. The simultaneous rise of the voltage at the resistor R1, i.e. also at the terminal P4, prevents a responding of the short-circuit disconnection because the comparator 38 is subjected at its two inputs to the increased voltage. The declining edge of a voltage peak of the supply voltage does not have any detrimental effect because the limitation of the voltage at the line 32 by the transistor T4 always maintains at said line the voltage value of about 1 V.

The case where a short-circuit is present parallel to the lamp before the switching on will now be investigated. In practice a short-circuit in the motor vehicle means a resistance of 0 to about 10 ohms which occurs parallel to the lamp, i.e. between the motor vehicle battery and the terminal P3. Such a short circuit would mean that the terminal point P3 has a low-resistance connection to the positive terminal of the supply voltage source. When a short-circuit is present on switching on the collector voltage of the transistor T5 is considerably higher than its saturation voltage. Without provision of the circuit described this high voltage at the terminal P3 would lead to destruction of the transistor T5. With the aid of the time constant which is defined by the value of the capacitor C and the value of the resistor R1 it is possible to fix how long the high voltage must be present at the terminal P3 before disconnection of the transistor T5 is effected. In the presence of a short-circuit the voltage at the terminal P4 begins to drop after the switching on and the drop continues until the limitation by the transistor T4 becomes effective and limits the voltage at the line 32 to 1 V. The voltage at the collector of the transistor T5 remains however high, i.e. at the value which is defined by the short-circuit resistance parallel to the lamp 12 and the collector current T5. The comparator 38 detects that the voltage at the terminal P3, i.e. at the collector of the transistor T5, is greater than the voltage at the line 32 and then furnishes at its output a blocking signal which is supplied to the control input 24 of the operational amplifier 26 and effects disconnection thereof. The operational amplifier 26 thereupon stops supplying current and the transistor T5 is thereby rendered nonconductive. In every case the dropping of the voltage at the terminal point P4 results via the current mirror comprising the transistors T1, T2 and T3 in a drop in the current supplied to the resistor R4. This operation effects a reduction of the voltage at the operational amplifier 26 and thus a reduction of the base current for the transistor T5 which is caused by the smaller voltage drop at the resistor R8 so that the output current of the transistor T5 becomes correspondingly smaller. The collector voltage of the transistor T5 is thereby further increased. In the case of a short-circuit this effect of the disconnection is further promoted by the comparator 38 so that the transistor T5 is rendered nonconductive more rapidly. This further increases the protection against destruction of the transistor T5.

If a short-circuit occurs when the lamp 12 is already switched on the voltage at the collector of the transistor T5 rises. The voltage at the terminal P4 is however not changed and as a result the transistor T5 is disconnected in the manner already described as soon as the voltage at the comparator input 36 becomes more positive than the voltage at the comparator input 40 (i.e. greater than 1 V). This prevents destruction of the transistor T5.

The driver circuit described operates in a large operating voltage range satisfactorily and this is of decisive significance in particular when used in a motor vehicle because in such a use for example operating voltages in the range of 6.5 to 16 volts can occur. The driver circuit effects an optimum switching on of the lamp 12, it being ensured that in the presence of feedbacks or short-circuits, which may exist before the switching on of the lamp 12 or occur when the lamp 12 is in the switched-on state, a reliable disconnection of the transistor T5 is always achieved.

I claim:

1. A driver circuit for switching on a lamp with a low cold resistance comprising:

a power transistor having a collector-emitter path connected to the lamp in a series circuit lying between a positive terminal and a ground terminal of a supply voltage source;

an RC member comprising a resistor connected on one side to the ground terminal, and a capacitor connected in series with said resistor and connected on one side thereof to the positive terminal of the supply voltage source;

comparator means having first and second inputs respectively connected to said resistor and to the collector of said power transistor for comparing the voltage at said resistor with the voltage at the collector of said power transistor and having an output operably connected to the base of said power transistor, the output of said comparator means providing a block signal when the voltage at said resistor is more negative than the voltage at the collector of said power transistor; and a voltage-limiting member interposed between said resistor and the first input of said comparator means in connected relationship therewith for limiting the voltage at said resistor to a voltage value lying above the saturation value of said power transistor.

2. A driver circuit as set forth in claim 1, further including an operational amplifier interposed between the output of said comparator means and the base of said power transistor and having a first input, a second feedback input, and a control input;

means for providing a voltage input to the first input of said operational amplifier;

said operational amplifier having an output connected to said second feedback input and connected to the base of said power transistor to supply base current thereto for rendering said power transistor conductive;

the output of said comparator means being connected to the control input of said operational amplifier; and said operational amplifier being deactivated in response to the reception of a blocking signal from the output of said comparator means by said control input to interrupt the supply of base current to the base of said power transistor for rendering said power transistor non-conductive.

3. A driver circuit as set forth in claim 2, wherein said voltage input-providing means comprises a stabilized voltage source.

4. A driver circuit as set forth in claim 3, further including a mirror current circuit connected to said first input of said operational amplifier for generating a current output dependent on the voltage at said resistor; and the current output from said mirror current circuit being supplied to the first input of said operational amplifier in addition to the voltage input from said stabilized voltage source.

5. A driver circuit for switching on a lamp with a low cold resistance comprising:

a power transistor having a collector-emitter path connected to the lamp in a series circuit lying between a positive terminal and a ground terminal of a supply voltage source;

an RC member comprising a resistor connected on one side to the ground terminal and a capacitor connected in series with said resistor and connected on one side to the positive terminal of the supply voltage source;

a current source circuit unit connected to a node intermediate said resistor and said capacitor for maintaining said capacitor in a discharged condition when the driver circuit is in a rest state;

comparator means having first and second inputs respectively connected to said resistor and the collector of said power transistor for comparing the voltage at said resistor with the voltage at the collector of said power transistor and providing at the output thereof a blocking signal when the voltage at said resistor is more negative than the voltage at the collector of said power transistor;

the output of said comparator means being operably connected to the base of said power transistor for rendering said power transistor non-conductive in response to the occurrence of a blocking signal at the output of said comparator means;

a voltage-limiting member interposed between said resistor and the first input of said comparator means for limiting the voltage at said resistor to a voltage value lying above the saturation value of said power transistor, said voltage-limiting member comprising a transistor;

a constant voltage source operably connected to the base of said transistor of said voltage-limiting member; and said transistor of said voltage-limiting member further having its emitter connected to a node intermediate said resistor and the first input of said comparator means.

* * * * *